US007336561B2

(12) United States Patent
Borresen (10) Patent No.: US 7,336,561 B2
(45) Date of Patent: Feb. 26, 2008

(54) SYSTEM FOR ATTENUATION OF WATER BOTTOM MULTIPLES IN SEISMIC DATA RECORDED BY PRESSURE SENSORS AND PARTICLE MOTION SENSORS

(75) Inventor: Claes Nicolai Borresen, Katy, TX (US)

(73) Assignee: PGS Americas, Inc., Houston, TX (US)

( * ) Notice: Subject to any disclaimer, the term of this patent is extended or adjusted under 35 U.S.C. 154(b) by 0 days.

(21) Appl. No.: 10/935,515

(22) Filed: Sep. 7, 2004

(65) Prior Publication Data

US 2006/0050611 A1 Mar. 9, 2006

(51) Int. Cl.
*G01V 1/38* (2006.01)
(52) U.S. Cl. .............................. 367/24; 367/15; 367/21
(58) Field of Classification Search .................. 367/15, 367/23, 24, 73, 21
See application file for complete search history.

(56) References Cited

U.S. PATENT DOCUMENTS

| | | | | | |
|---|---|---|---|---|---|
| 4,887,244 | A | * | 12/1989 | Willis et al. ................... | 367/73 |
| 4,935,903 | A | * | 6/1990 | Sanders et al. ................ | 367/24 |
| 4,979,150 | A | * | 12/1990 | Barr ............................ | 367/24 |
| 5,793,702 | A | * | 8/1998 | Paffenholz .................... | 367/24 |
| 5,835,451 | A | * | 11/1998 | Soubaras ...................... | 367/24 |
| 6,141,623 | A | * | 10/2000 | Paffenholz .................... | 702/17 |
| 6,169,959 | B1 | * | 1/2001 | Dragoset Jr. .................. | 702/17 |
| 6,246,637 | B1 | * | 6/2001 | Gidlow ......................... | 367/16 |
| 6,477,470 | B2 | * | 11/2002 | Fokkema et al. .............. | 367/21 |
| 6,681,887 | B1 | * | 1/2004 | Kragh et al. .................. | 181/110 |
| 6,704,244 | B1 | * | 3/2004 | Vaage .......................... | 367/24 |
| 6,775,618 | B1 | * | 8/2004 | Robertsson et al. ........... | 702/14 |
| 2003/0048696 | A1 | * | 3/2003 | Duren .......................... | 367/24 |
| 2003/0147306 | A1 | * | 8/2003 | Robertsson ................... | 367/24 |
| 2005/0013194 | A1 | * | 1/2005 | Vaage et al. .................. | 367/24 |
| 2005/0073909 | A1 | * | 4/2005 | Laws et al. ................... | 367/15 |
| 2005/0195686 | A1 | * | 9/2005 | Vaage et al. .................. | 367/21 |

OTHER PUBLICATIONS

John R. Berryhill, "Wave equation datuming", Geophysics, Aug. 1979, pp. 1329-1344, vol. 44, No. 8.

(Continued)

*Primary Examiner*—Jack Keith
*Assistant Examiner*—Scott A Hughes
(74) *Attorney, Agent, or Firm*—E. Eugene Thigpen; Richard A. Fagin (57) ABSTRACT

An up-going wavefield and a down-going wavefield are calculated at a sensor position from a pressure sensor signal and a particle motion sensor signal. Then, an up-going wavefield is calculated at a water bottom position substantially without water bottom multiples from the up-going and down-going wavefields at the sensor position. In one embodiment, the up-going wavefield at the sensor position is backward propagated to the water bottom, resulting in an up-going wavefield at the water bottom. The down-going wavefield at the sensor position is forward propagated to the water bottom, resulting in a down-going wavefield at the water bottom. The up-going wavefield at the water bottom without water bottom multiples is calculated from the backward propagated up-going wavefield at the water bottom, the forward propagated down-going wavefield at the water bottom, and a reflection coefficient of the water bottom.

8 Claims, 3 Drawing Sheets

OTHER PUBLICATIONS

John R. Berryhill, "Wave equation datuming before stack", Geophysics, Nov. 1984, pp. 2064-2066, vol. 49, No. 11.

J. R. Berryhill, Y. C. Kim, "Deep-water peg legs and multiples: Emulation and suppression", Geophysics, Dec. 1986, vol. 51, No. 12.

J. Wendell Wiggins, "Attenuation of complex water-bottom multiples by wave-equation-based prediction and subtraction", Geophysics, Dec. 1988, pp. 1527-1539, vol. 53, No. 12.

Dmitri Lokshtanov, "Suppression of water-layer multiples—from deconvolution to wave-equation approach", 70th Ann. Int. Mtg., SEG, Abstracts, Aug. 6-11, 2000, pp. 1981-1984.

* cited by examiner

SYSTEM FOR ATTENUATION OF WATER BOTTOM MULTIPLES IN SEISMIC DATA RECORDED BY PRESSURE SENSORS AND PARTICLE MOTION SENSORS

CROSS-REFERENCES TO RELATED APPLICATIONS

Not Applicable.

FEDERALLY SPONSOR RESEARCH OR DEVELOPMENT

Not Applicable.

SEQUENCE LISTING, TABLE, OR COMPUTER LISTING

Not Applicable.

BACKGROUND OF THE INVENTION

1. Field of the Invention

This invention relates generally to the field of geophysical prospecting. More particularly, the invention relates to the field of seismic data processing. Specifically, the invention is a method for attenuation of water bottom multiples from seismic data recorded by pressure sensors and particle motion sensors in marine towed streamers.

2. Description of the Related Art

In the field of geophysical prospecting, the knowledge of the subsurface structure of the earth is useful for finding and extracting valuable mineral resources, such as oil and natural gas. A well-known tool of geophysical prospecting is a seismic survey. A seismic survey transmits acoustic waves emitted from appropriate energy sources into the earth and collects the reflected signals using an array of sensors. Then seismic data processing techniques are applied to the collected data to estimate the subsurface structure.

In a seismic survey, the seismic signal is generated by injecting an acoustic signal from on or near the earth's surface, which then travels downwardly into the subsurface of the earth. In a marine survey, the acoustic signal may also travel downwardly through a body of water. Appropriate energy sources may include explosives or vibrators on land and air guns or marine vibrators in water. When the acoustic signal encounters a seismic reflector, an interface between two subsurface strata having different acoustic impedances, a portion of the acoustic signal is reflected back to the surface, where the reflected energy is detected by a sensor. Seismic sensors detect and measure the amplitude of different physical aspects of the passing seismic waves.

Appropriate types of seismic sensors may include particle velocity sensors in land surveys and water pressure sensors in marine surveys. Sometimes particle motion or particle acceleration sensors are used instead of particle velocity sensors. Particle velocity sensors are commonly know in the art as geophones and water pressure sensors are commonly know in the art as hydrophones. Both seismic sources and seismic sensors may be deployed by themselves or, more commonly, in arrays. Additionally, pressure sensors and particle velocity sensors may be deployed together, co-located in pairs or pairs of arrays along a seismic cable, in a marine survey.

In a typical marine seismic survey, a plurality of streamer cables are towed behind a vessel. One or more seismic sources are also normally towed behind the vessel. Alternatively, the seismic cables are maintained at a substantially stationary position in a body of water, either floating at a selected depth or lying on the bottom of the body of water. In this alternative case, the source may be towed behind a vessel to generate acoustic energy at varying locations, or the source may also be maintained in a stationary position.

The seismic energy recorded by each pair of sources and sensors during the data acquisition stage is known as a seismic trace. Seismic data traces contain the desired seismic reflections, known as the primary reflections or primaries. A primary reflection comes from the detection of an acoustic signal that travels from a source to a sensor with but a single reflection from a subsurface seismic reflector. Unfortunately, the seismic traces often contain many unwanted additional reflections known as multiple reflections or multiples, which can obscure and even overwhelm the sought-after primary reflections. A multiple reflection comes from the recording of an acoustic signal that has reflected more than once before being detected by a sensor. The additional multiple reflections could come from subsurface reflectors or from the surface of the earth in a land seismic survey and the water-earth or air-water interfaces in a water seismic survey. The recorded signals from multiples obscure the recorded signals from the primaries, making it harder to identify and interpret the desired primaries. Thus, the removal, or at least attenuation, of multiples is a desired step in seismic data processing in many environments. This is particularly so in marine seismic surveys, where multiples are especially strong relative to primaries. Multiples are strong because the water-earth and, particularly, the air-water interfaces are strong seismic reflectors due to their high acoustic impedance contrasts.

Figure 1:
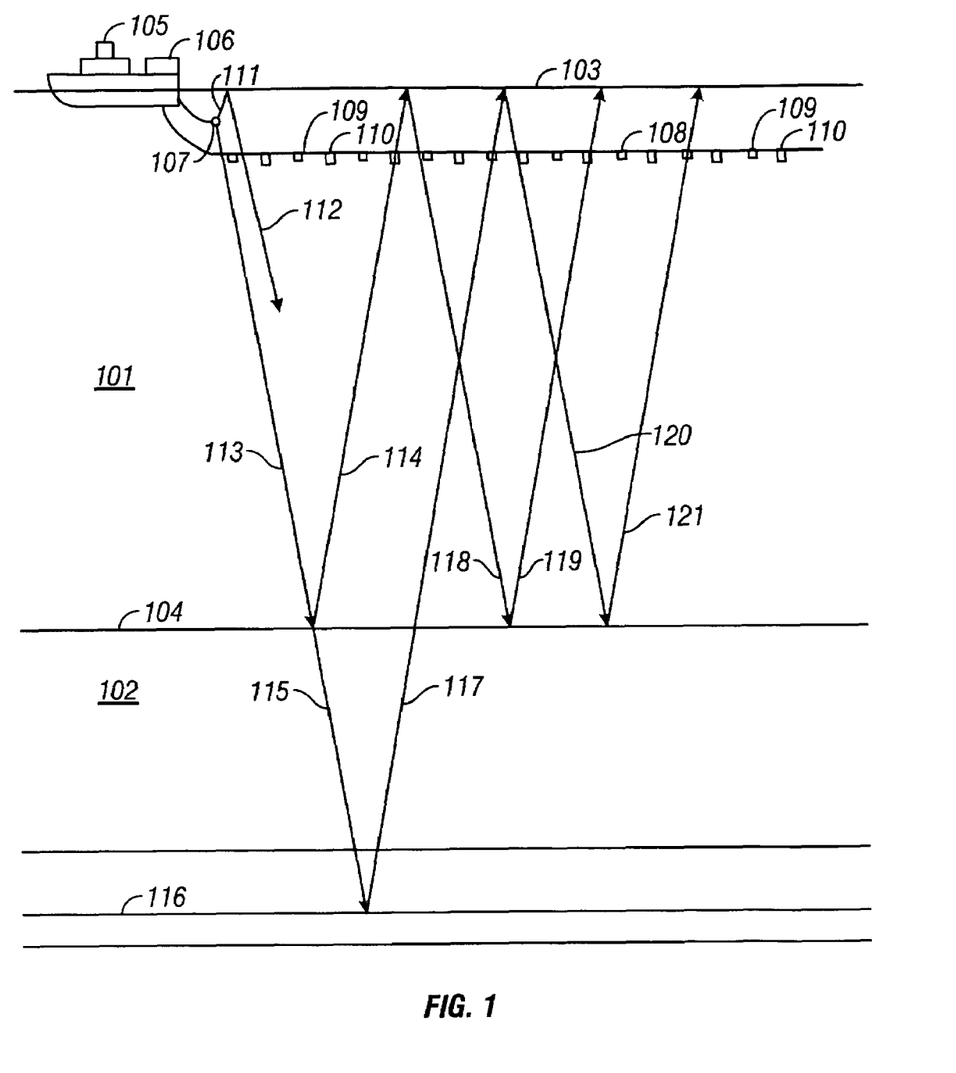
FIG. 1 is an elevation view of a typical marine seismic survey.

FIG. 1 shows a schematic illustration (not drawn to scale) of an elevation view of a typical marine seismic survey. This illustration demonstrates a means for acquiring marine seismic data that can be used with the method of the invention. A body of water 101 over the earth 102 is bounded at the water surface 103 by a water-air interface and at the water bottom 104 by a water-earth interface. Beneath the water bottom 104, the earth 102 contains subterranean formations of interest. A seismic vessel 105 travels on the water surface 103 and contains seismic acquisition control equipment, designated generally as 106. The seismic acquisition control equipment 106 includes navigation control, seismic source control, seismic sensor control, and recording equipment, all of types well known in the art of seismic acquisition.

The seismic acquisition control equipment 106 causes a seismic source 107 towed in the body of water 101 by the seismic vessel 105 to actuate at selected times. The seismic source 107 may be of any type well known in the art of seismic acquisition, including airguns or water guns, or particularly, arrays of airguns. Seismic streamers 108 are also towed in the body of water 101 by the original seismic survey vessel 105 or by another seismic survey ship (not shown). Although only one seismic streamer 108 is shown here for illustrative simplicity, typically a plurality of seismic streamers 108 are towed behind the seismic vessel 105. The seismic streamers 108 contain sensors to detect the reflected wavefields initiated by the seismic source 107 and reflected from interfaces in the environment. Conventionally, the seismic streamers 108 contain pressure sensors such as hydrophones 109, but seismic streamers 108 known as dual sensor seismic streamers also contain water particle motion sensors such as geophones 110. The hydrophones 109 and geophones 110 are typically co-located in pairs or pairs of sensor arrays at regular intervals along the seismic streamers 108. However, the type of sensors 109, 110 or their location in the seismic streamers 108 is not intended to be a limitation on the present invention.

The seismic source 107 is towed through the body of water 101 and activated at periodic intervals to emit acoustic waves in the vicinity of the seismic streamers 108 with its sensors 109, 110. The process repeats until the seismic survey is completed. Each time the seismic source 107 is actuated, an acoustic wavefield travels upwardly or downwardly in spherically expanding wave fronts. The traveling wavefields will be illustrated by ray paths normal to the expanding wave fronts. The upwardly traveling wavefield, designated by ray path 111, will reflect off the water-air interface at the water surface 103 and then travel downwardly, as in ray path 112, where the wavefield may be detected by the hydrophones 109 and geophones 110 in the seismic streamers 108. Unfortunately, such a reflection at the water surface 103, as in ray path 112, contains no useful information about the subterranean formations of interest. However, such surface reflections, also known as ghosts, act like secondary seismic sources with a time delay.

The downwardly traveling wavefield from the seismic source 107, in ray path 113, will reflect off the earth-water interface at the water bottom 104 and then travel upwardly, as in ray path 114, where the wavefield may be detected by the hydrophones 109 and geophones 110. Such a reflection at the water bottom 104, as in ray path 114, contains information about the water bottom 104 and hence may be retained for further processing. Ray path 114 is an example of a water bottom multiple, having at least one reflection at the water bottom 104. Additionally, the downwardly traveling wavefield, as in ray path 113, may transmit through the water bottom 104 as in ray path 118, reflect off a layer boundary, such as 116, and then travel upwardly, as in ray path 117. The upwardly traveling wavefield, ray path 117, may then be detected by the hydrophones 109 and geophones 110. Such a reflection off a layer boundary 116 may contain useful information about subterranean formations of interest and is also an example of a primary reflection, having one reflection in the subterranean earth.

Unfortunately, the acoustic wavefields will continue to reflect off interfaces such as the water bottom 104, water surface 103, and layer boundaries, such as 116, in combinations. For example, the upwardly traveling wavefield in ray path 114 will reflect off the water surface 103, continue traveling downwardly in ray path 118, may reflect off the water bottom 104, and continue traveling upwardly again in ray path 119, where the wavefield may be detected by the hydrophones 109 and geophones 110. Ray path 119 is an example of a multiple reflection called a water bottom multiple, having at least one reflection from the water bottom 104. Similarly, the upwardly traveling wavefield in ray path 117 will reflect off the water surface 103, continue traveling downwardly in ray path 120, may reflect off the water bottom 104 and continue traveling upwardly again in ray path 121, where the wavefield may be detected by the hydrophones 109 and geophones 110. Ray path 121 is an example of a multiple reflection called a peg-leg, having at least one reflection in the subterranean earth and at least one reflection from the water bottom 104. Multiple reflections contain redundant information about the formations of interest and multiples are commonly removed from seismic data before further processing.

The traces obtained in performing the survey must be processed prior to final display and analysis to compensate for various factors which impede utilization of the original traces. One of the most troublesome of the processing steps involves compensating for multiples and peg-legs by attenuating them from the original traces.

Removing multiples from seismic data requires the ability to discriminate the multiples from the rest of the seismic signal. This discrimination requires predicting the multiples from the recorded seismic signal and other data, such as the location of the water bottom. When the repeat interval of the multiple is only a few times the length of the source wavelet, the resulting short-period multiples are approximately periodic. Then, the short-period multiples may be discriminated on the basis of their periodicity and attenuated using the well-known technique of predictive deconvolution. However, when the length of the multiple reflection path becomes long compared to the source wavelet duration, the multiples are no longer periodic and predictive deconvolution no longer works well. One of the techniques known in the art of seismic data processing for attenuating long-period multiples is wave-equation datuming.

Berryhill, John R., 1979, "Wave equation datuming", *Geophysics*, Vol. 44, No. 8 (August), p. 1329-1344, describes the wave-equation datuming procedure for changing the datum of a collection of zero-offset traces from one surface of arbitrary shape to another, for non-constant wave propagation velocity. Wave-equation datuming employs upward or downward continuation of seismic time data to redefine the reference surface on which the seismic sources and sensors appear to be located. Berryhill (1979) applies the procedure to velocity replacement datum corrections and multilayer forward modeling.

Berryhill, John R., 1984, "Wave equation datuming before stack (short note)", *Geophysics*, Vol. 49, No. 11 (November), p. 2064-2067, extends the wave-equation datuming procedure of Berryhill (1979) from zero-offset traces to unstacked seismic data. Berryhill (1984) describes a two-step method. First, the sensors are extrapolated from one datum to another datum, by operating on the seismic traces sorted in common source gathers, and then, the sources are extrapolated by operating on the seismic traces sorted in common-sensor groups. The common source and common sensor gathers must take the form of symmetric split spreads if both directions of dip are to be treated equally, or the gathers must be constructed artificially by reciprocity if not recorded in that form.

Figure 2:
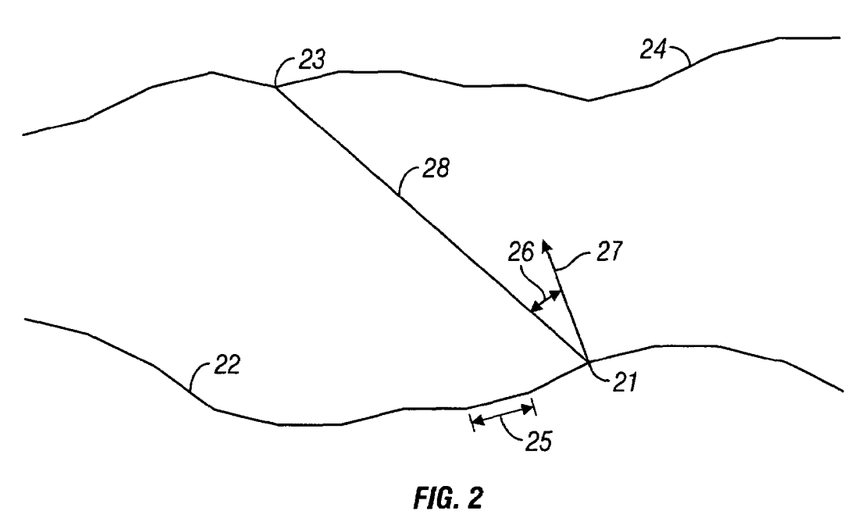
FIG. 2 is a schematic illustration of the geometric quantities appearing in the definition of wave-equation datuming.

The method of wave-equation datuming introduced by Berryhill (1979, 1984) propagates (extrapolates) upgoing wavefields backward and downgoing wavefields forward in space and time. The propagation can move sources and sensors from a first datum surface (such as the sensor position) to a second datum surface (such as the water bottom). The form of the propagation is a summation from Berryhill (1979, 1984):

$$U_j(t) = \frac{1}{\pi}\sum_i \Delta x_i \cos\theta_i \frac{t_i}{r_i}[U_i(t-t_i) * F_i], \quad (1)$$

where FIG. 2 shows a schematic illustration of the geometric quantities appearing in the definition of wave-equation datuming in Equation (1). Thus, $U_i(t-t_i)$ is an input trace recorded at a location 21 on the first datum surface 22 and $U_j(t)$ is an output trace computed at any location 23 on the second datum surface 24. Additionally, $\Delta x_i$ is the spacing 25 between input locations 21 on the first datum surface 22, $\theta_i$ is the angle 26 between the normal 27 to the datum surface and the vector 28 connecting the input location 21 and the output location 23, $t_i$ is the traveltime between the input location 21 and output location 23 along the vector 28, and $r_i$ is the distance between the input location 21 and the output location 23 along the vector 28. The argument $(t-t_i)$ implies that $U_i$ is delayed by traveltime $t_i$. The asterisk * in Equation (1) denotes convolution of the input trace $U_i$ with a filter operator $F_i$. The filter operator $F_i$ arises from Kirchhoff integration transverse to the line and is employed to prevent waveform and amplitude distortion. Berryhill (1979) describes an example of such a filter operator of 5 to 10 samples which is equivalent to the second derivative of a tangent function.

Equation (1), as it stands, describes the upward propagation of upcoming waves. To compute the downward propagation of upcoming waves, the input and output traces are time-reversed (a conjugate transpose procedure). Equation (1) can be written in three dimensions as:

$$U(t) = \frac{1}{2\pi} \sum_i \sum_k \Delta x_i \Delta x_k \cos\theta_{ik} \frac{t_{ik}}{r_{ik}} [U_{ik}(t - t_{ik}) * F_{ik}],\quad (2)$$

where I and k designate the x and y locations, respectively, of the input trace $U_{ik}$ on the first datum surface, $\Delta x_i$ and $\Delta y_k$ are the spacing in the x- and y-directions, respectively, between input locations on the first datum surface, and the other variables are defined similarly to those in Equation (1).

A common method for employing wave-equation datuming is in the prediction and subtraction method for attenuating multiples. First, the multiples are predicted, by means of wave-equation datuming. Then the predicted multiples are subtracted from the original recorded signal to yield the desired primary reflections. The following are examples of this approach.

Berryhill, John R. and Kim, Y. C., 1986, "Deep-water peg legs and multiples: Emulation and suppression", Geophysics, Vol. 51, No. 12 (December), p. 2177-2184, describes a prediction and subtraction method of wave-equation datuming for attenuating multiple and peg leg reflections in unstacked seismic data. First, an observed seismic record is extrapolated through a round-trip traversal of the water layer, thus creating a prediction of possible multiples and peg-legs. Second, the record containing the predicted multiples and peg-legs is compared with and subtracted from the original recorded data.

Wiggins, J. Wendell, 1988, "Attenuation of complex water-bottom multiples by wave-equation-based prediction and subtraction", Geophysics, Vol. 53, No. 12 (December), p. 1527-1539, describes a wave equation approach for the prediction and subtraction of water-layer multiples and peg-leg multiples. The two-step prediction method first performs a wave equation extrapolation and second performs a local estimate of the water bottom reflectivity. Two wave equation extrapolations are performed on the recorded data from the recording datum to the water bottom. One extrapolation is forward in time and the other extrapolation is backward in time. Comparison of the two extrapolated data sets produces the local estimate of the water bottom reflectivity. Combination of the forward extrapolated data set and the estimated water bottom reflectivity produce a prediction of the multiples, which are then subtracted from the backward extrapolated data set to produce multiple-attenuated data set. Finally, this data set is extrapolated back to the recording datum.

Lokshtanov, Dmitri, 2000, "Suppression of water-layer multiples—from deconvolution to wave-equation approach", 70th Annual International Meeting, Society of Exploration Geophysicists, Expanded Abstracts, p. 1981-1984, describes a wave equation approach for the prediction and subtraction of water-layer multiples and peg-leg multiples. The method extrapolates Radon transformed CMP gathers to yield Radon transformed CMP gathers of the predicted multiples, from the geometry of the water bottom. The method then applies adaptive subtraction.

All of the above methods apply wave-equation datuming to pressure sensor signals only. However, the pressure sensor data has spectral notches caused by the water surface reflections. These spectral notches are often in the seismic acquisition frequency band. Thus, the usable portion of the pressure sensor data is frequency band limited away from the spectral notches and cannot cover the entire seismic acquisition frequency band. This limitation can be avoided by using both pressure sensors and particle motion sensors. Thus, a need exists for a method of attenuation of long-period water bottom multiples from seismic data that takes advantage of the information contained in the signals recorded by both pressure sensors and particle motion sensors in marine towed streamers.

BRIEF SUMMARY OF THE INVENTION

The invention is a method for attenuation of water bottom multiples from seismic data recorded by pressure sensors and particle motion sensors in marine towed streamers. An up-going wavefield and a down-going wavefield are calculated at a sensor position from a pressure sensor signal and a particle motion sensor signal. Then, an up-going wavefield is calculated at a water bottom position substantially without water bottom multiples from the up-going and down-going wavefields at the sensor position.

In one embodiment of the invention, an up-going wavefield is calculated at the sensor position from a pressure sensor signal and a particle motion sensor signal. A down-going wavefield is calculated at the sensor position from the pressure sensor and particle motion sensor signals. The up-going wavefield at the sensor position is backward propagated to the water bottom, resulting in an up-going wavefield at the water bottom. The down-going wavefield at the sensor position is forward propagated to the water bottom, resulting in a down-going wavefield at the water bottom. An up-going wavefield at the water bottom without water bottom multiples is calculated from the backward propagated up-going wavefield at the water bottom, the forward propagated down-going wavefield at the water bottom, and a reflection coefficient of the water bottom.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the

DETAILED DESCRIPTION OF THE INVENTION

The invention is a method for attenuation of water bottom multiples from seismic data recorded by pressure sensors and particle motion sensors in marine towed streamers. In one embodiment, the pressure sensors and particle motion sensors are co-located in the towed streamer. In an alternative embodiment, the sensors have sufficient spatial density so that the respective wavefields recorded by the pressure sensors and particle motion sensors, can be interpolated or extrapolated to produce the two wavefields at the same location.

The method of the invention is a prediction and subtraction method for attenuating multiples. First, however, before the prediction step, the upgoing and downgoing wavefields at the position of the sensors in the seismic streamers are calculated from both the pressure sensor signal and the particle motion sensor signal. Then, the multiples are predicted by means of wave-equation datuming and the predicted multiples are subtracted from the original recorded signal to yield primary reflections. The multiples are predicted by forward propagating in time the downgoing wavefield from the sensor position down to the water bottom and then multiplying the result by the reflection coefficient of the water bottom. This result of this multiplication predicts the upgoing water bottom multiples at the water bottom. The multiples are subtracted by backward propagating in time the upgoing wavefield from the sensor position down to the water bottom and then subtracting the predicted upgoing water bottom multiples.

The method of the invention works for long-period water bottom multiples in moderate to deep water depths of greater than approximately 200 meters. The method of the invention requires knowledge of the water velocity, but not of the seismic velocities of the subterranean earth layers. The method also requires knowledge of the water bottom location. However, the method is not limited by the complexity of the geometry of the water bottom.

Figure 3:
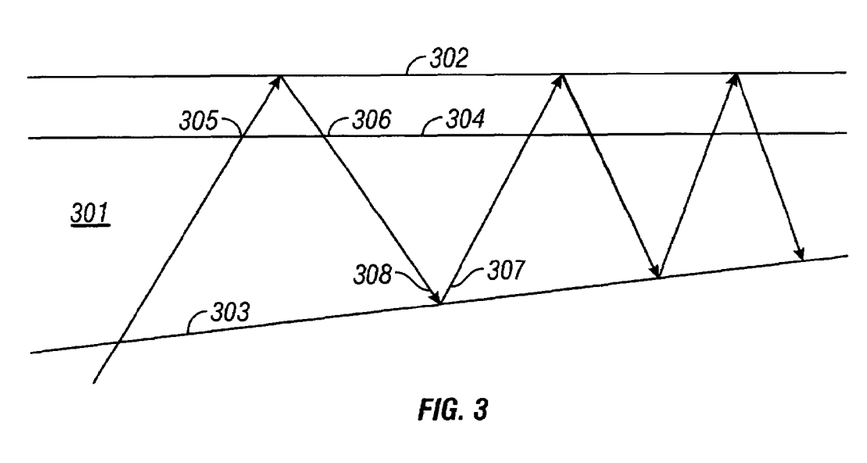
FIG. 3 is an elevation view of water bottom multiples.

FIG. 3 shows a schematic illustration (not drawn to scale) of an elevation view of water bottom multiples. A body of water 301 over the earth is bounded at the water surface 302 by a water-air interface and at the water bottom 303 by a water-earth interface. A single seismic streamer containing sensors 304 is shown for illustrative simplicity in the body of water 301. Conventionally, the sensors 304 would typically be pressure sensors, illustrated here by hydrophones. For the method of the invention, the sensors 304 include particle velocity sensors, illustrated here by geophones.

Wavefields in general will be designated by $w(t)$, while hydrophone and geophone signals will be designated by $h(t)$ and $g(t)$, respectively. The superscripts s and b will designate sensor position 304 and water bottom position 303, respectively, of either a wavefield $w(t)$ or a hydrophone signal $h(t)$ or geophone signal $g(t)$. Thus, the wavefield $w^s(t)$ designates a wavefield as it would be detected at the sensor position 304 in the seismic streamer. Similarly, the wavefield $w^b(t)$ designates the wavefield as it would be detected at the water/earth interface at the water bottom 303.

The subscripts u and d designate up-going and down-going travel directions, respectively, of the wavefields at any location. Thus, the wavefield $w^s(t)$ at the sensor position 304 comprises an up-going part $w^s(t)_u$ 305 and a downgoing part $w^s(t)_d$ 306. Similarly, the wavefield $w^b(t)$ at the water bottom 303 comprises an up-going part $w^b(t)_u$ 307 and a downgoing part $w^b(t)_d$ 308. The additional subscripts m and s will designate the water bottom multiples and the remaining signal, respectively, in the wavefields.

The up-going wavefield $w^b(t)_u$ 308 at the water bottom 303 contains both water bottom multiples and other signals. Thus, $w^b(t)_u$ 308 may be divided into the sum of a part $w^b(t)_{um}$ with water bottom multiples and a remaining part $w^b(t)_{us}$ without water bottom multiples by:

$$w^b(t)_u = w^b(t)_{us} + w^b(t)_{um}. \tag{3}$$

Similarly, the down-going wavefield $w^b(t)_d$ 307 at the water bottom 303 contains both water bottom multiples and other signals, recorded after these events have been reflected by the water/air interface at the water surface 302. Thus, $w^b(t)_d$ 307 may be divided into the sum of a part $w^b(t)_{dm}$ with water bottom multiples and a remaining part $w^b(t)_{ds}$ without water bottom multiples by:

$$w^b(t)_d = w^b(t)_{ds} + w^b(t)_{dm}. \tag{4}$$

A particle motion sensor like a geophone has directional sensitivity, whereas a pressure sensor like a hydrophone does not. The water/air interface at the water surface 302 is an excellent reflector and the reflection coefficient at the water surface 302 is nearly unity in magnitude and is negative in sign for pressure signals. Thus, the waves reflected at the water surface 302 will be phase-shifted 180 degrees relative to the upwardly propagating waves. Accordingly, the upgoing wavefield signals detected by a geophone and hydrophone located close together will be in phase, while the downgoing wavefield signals will be recorded 180 degrees out of phase.

Thus, the recorded hydrophone signal $h^s(t)$ at the sensor position 304 is the sum of the up-going wavefield $w^s(t)_u$ 305 and the down-going wavefield $w^s(t)_d$ 306 at the sensor position 304:

$$h^s(t) = w^s(t)_u + w^s(t)_d, \tag{5}$$

while the recorded geophone signal $g^s(t)$ at the sensor position 304 is the difference of the up-going wavefield $w^s(t)_u$ 305 and the down-going wavefield $w^s(t)_d$ 306 at the sensor position 304:

$$g^s(t) = w^s(t)_u - w^s(t)_d. \tag{6}$$

Rearranging Equations (5) and (6) yields a method for calculating the up-going wavefield $w^s(t)_u$ 305 and the down-going wavefield $w^s(t)_d$ 306 at the sensor position 304:

$$w^s(t)_u = \frac{h^s(t) + g^s(t)}{2} \tag{7}$$

and $$w^s(t)_d = \frac{h^s(t) + g^s(t)}{2}. \tag{8}$$

Wave-equation datuming is used to transfer the seismic data from one reference level to another. In the present invention, the reference level for the up- and down-going wave fields is transferred from the sensor position 304 to the water bottom 303. The down-going wavefield $w^s(t)_d$ 306 has to be forward propagated to positions on the water bottom 303 and then the up-going wavefield $w^s(t)_u$ 305 has to be backward propagated to the same positions on the water bottom 303.

If the upgoing wavefield $w^s(t)_u$ 305 at the sensor position 304 from Equation (7) is backward propagated to the water bottom 303, then an upgoing wavefield $w^b(t)_u$ 308 at the water bottom 303 results that contains both water bottom multiple events $w^b(t)_{um}$ and other signals $w^b(t)_{us}$ as if the data had been recorded by sensors located at the water bottom 303. All the water bottom multiple events in upgoing wavefield $w^b(t)_u$ 308 must be up-going events. Thus, $$w^b(t)_u = w^b(t)_{us} + w^b(t)_{um}. \quad (9)$$

If the downgoing wavefield $w^s(t)_d$ 306 at the sensor position 304 from Equation (8) is forward propagated to the water bottom 303, then an upgoing wavefield $w^b(t)_d$ 307 results that only contains events after a reflection with the water/air interface at the water surface 302, as if this data had been recorded by sensors located at the water bottom 303. All events in downgoing wavefield $w^b(t)_d$ 307 will reflect off the water bottom 303 according to the reflection coefficient R of the water bottom 303. These reflected events from $w^b(t)_d$ 307 reflecting off the water bottom 303 must be the same as the water bottom multiples $w^b(t)_{um}$ in Equation (9), which means that:

$$w^b(t)_{um} = R * w^b(t)_d. \quad (10)$$

Substituting Equation (10) into Equation (9) yields:

$$w^b(t)_{us} = w^b(t)_u - R * w^b(t)_d. \quad (11)$$

In above Equations (3)-(11), the assumption has been made that the geophone can record the total wave field $g^s(t)$. However, for a configuration with vertical geophones, the amplitude of the geophone recording needs to be adjusted from the recorded signal of a vertical geophone $g^{sv}(t)$ to the recorded signal of a geophone detecting the total wavefield $g^s(t)$ by the relation:

$$g^s(t) = \frac{g^{sv}(t)}{\cos(\theta)}, \quad (12)$$

where $\Theta$ is the angle of incidence between wave front and sensor (=0 if vertical arrival).

The angle $\Theta$ cannot be described as a single function of time, since multiple wave fronts can arrive at the same time for any given geophone. However, one of the computational steps in the wave-equation datuming process is performed over all possible angles of incidence in accordance, with the acoustic wave equation. If the data was recorded with a vertical geophone, the correction for angle of incidence can be done during this computational step.

Figure 4:
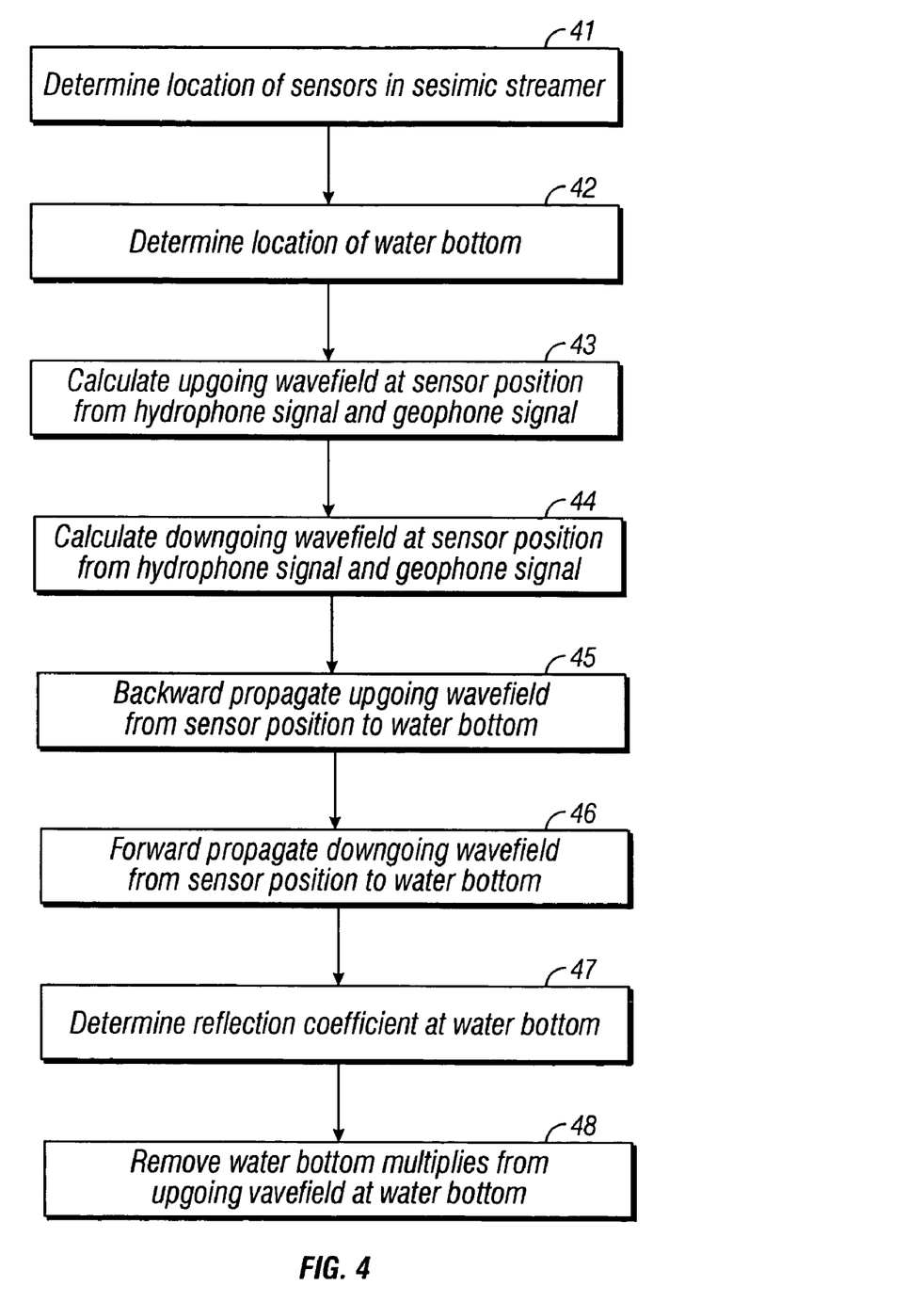
FIG. 4 is a flowchart illustrating the processing steps of an embodiment of the method of the invention for attenuation of water bottom multiples from seismic data.

FIG. 4 is a flowchart illustrating the processing steps of an embodiment of the method of the invention for attenuation of water bottom multiples from seismic data recorded by pressure sensors and particle motion sensors in marine towed streamers. For illustrative simplicity, and not as a limitation on the invention, the pressure sensors and particle motion sensors will be referred to by their conventional embodiments of hydrophones and geophones, respectively. The seismic data is preferably in the form of common shot gathers or common sensor gathers.

The hydrophone and geophone signals are preferably first corrected for relative differences in the instrument transfer functions, which correspond to instrument impulse responses in the time domain. Typically, the amplitude and phase of the geophone data are corrected to match the hydrophone data. In an alternative embodiment, the hydrophone data are corrected to match the geophone data, or, in a further alternative embodiment, both data sets are corrected to a common basis. Computational means for correcting for relative differences in instrument impulse responses are well known in the art. Additionally, an amplitude scaling equal to the inverse of the acoustic impedance in the water may be applied to the geophone data to correct for the relative differences in amplitudes of pressure and particle velocity. Computational means for this additional amplitude correction are also well known in the art.

At step 41, the location of sensor positions in the marine towed streamers is determined by any method known in the art. The location of the sensor positions forms a sensor position datum.

At step 42, the location of the water bottom is determined by any method known in the art. The location of the water bottom forms a water bottom datum.

At step 43, an up-going wavefield $w^s(t)_u$ at the sensor position datum is calculated from a sum of a hydrophone signal $h^s(t)$ and a geophone signal $g^s(t)$. The calculation is preferably as given in Equation (7), above.

At step 44, a down-going wavefield $w^s(t)_d$ at the sensor position datum is calculated from a difference of a hydrophone signal $h^s(t)$ and a geophone signal $g^s(t)$. The calculation is preferably as given in Equation (8), above.

At step 45, the up-going wavefield $w^s(t)_u$ at the sensor position datum is backward propagated from the sensor position datum down in space to the water bottom datum, resulting in an up-going wavefield $w^b(t)_u$ at the water bottom datum. This backward propagation by wave-equation datuming moves the datum from the sensor position datum to the water bottom datum. If the geophone is a vertical geophone, then the scaling in Equation (12) above is performed for each angle of incidence during the backward propagation process.

The extrapolation may be done by any extrapolation methods known in the art. By way of example, but not of limitation, the extrapolation may be done by Kirchhoff or phase shift methods. A phase-shift method is typically computationally faster for the case of a flat water bottom and consistent trace spacing. A Kirchhoff method typically provides greater accuracy for varying water bottoms, but is computationally more expensive than a phase-shift method.

At step 46, the down-going wavefield $w^s(t)_d$ at the sensor position datum is forward propagated from the sensor position datum down in space to the water bottom datum, resulting in a down-going wavefield $w^b(t)_d$ at the water bottom datum. This forward propagation by wave-equation datuming moves the datum from the sensor position datum to the water bottom datum. Again, if the geophone is a vertical geophone, then the scaling in Equation (12) is performed for each angle of incidence during the forward propagation process.

At step 47, a reflection coefficient R at the water bottom datum is determined. Methods for determining the water bottom reflection coefficient R are well known in the art.

At step 48, water bottom multiples are removed from the up-going wavefield $w^b(t)_u$ at the water bottom datum. This removal employs the backward propagated up-going wavefield $w^b(t)_u$ at the water bottom datum, the forward propagated down-going wavefield $w^b(t)_d$ at the water bottom datum, and the reflection coefficient R of the water bottom datum. This removal is preferably accomplished by applying Equation (11) above, resulting in an up-going wavefield $w^b(t)_{us}$ at the water bottom datum without water bottom multiples.

In the process summarized by Equation (11), the forward propagated downgoing wavefield $w^b(t)_d$ at the water bottom datum is multiplied by the reflection coefficient R of the water bottom datum. This multiplication result predicts the upgoing water bottom multiples $w^b(t)_{um}$ at the water bottom, as Equation (10) states. At this point, it may be effective to compare the predicted water bottom multiples, $R*w^b(t)_d$, to the water bottom multiples, $w^b(t)_{um}$, in the recorded wavefield, before subtracting. The predicted water bottom multiples may be first equalized to agree with the recorded water bottom multiples in such variables as amplitude, phase, and arrival time. Then the subtraction in Equation (11) may be more accurately made.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:

1. A method for attenuation of water bottom multiples in marine seismic data, comprising:
    calculating an up-going wavefield at a sensor position from a sum of a pressure sensor signal and a particle motion sensor signal recorded in a marine seismic streamer;
    calculating a down-going wavefield at the sensor position from a difference of the pressure sensor signal and the particle motion sensor signal recorded in the marine seismic streamer;
    backward propagating the up-going wavefield at the sensor position to the water bottom, resulting in an up-going wavefield at the water bottom;
    forward propagating the down-going wavefield at the sensor position to the water bottom, resulting in a down-going wavefield at the water bottom;
    determining a reflection coefficient at the water bottom datum;
    multiplying the reflection coefficient at the water bottom by the down-going wavefield at the water bottom, resulting in predicted water bottom multiples;
    equalizing the predicted water bottom multiples to agree with recorded water bottom multiples in amplitude, phase, and arrival time;
    subtracting the equalized predicted water bottom multiples from the up-going wavefield at the water bottom to generate an up-going wavefield substantially without water bottom multiples.

2. The method of claim 1, further comprising the initial steps of:
    determining a sensor position datum; and
    determining a water bottom datum.

3. The method of claim 2, wherein the step of backward propagating comprises applying wave-equation datuming to move the up-going wavefield from the sensor position datum to the water bottom datum.

4. The method of claim 2, wherein the step of forward propagating comprises applying wave-equation datuming to move the down-going wavefield from the sensor position datum to the water bottom datum.

5. The method of claim 1, wherein the step of subtracting to generate an up-going wavefield $w^b(t)_{us}$ at the water bottom substantially without water bottom multiples comprises applying the equation:

$$w^b(t)_{us} = w^b(t)_u - R*w^b(t)_d,$$

where $w^b(t)_u$ is the up-going wavefield at the water bottom, $w^b(t)_d$ is the down-going wavefield at the water bottom, and R is the reflection coefficient of the water bottom.

6. The method of claim 1, wherein the step of calculating an up-going wavefield $w^s(t)_u$ at the sensor position comprises applying the equation:

$$w^s(t)_u = \frac{h^s(t) + g^s(t)}{2},$$

where $h^s(t)$ is a hydrophone signal recorded at the sensor position and $g^s(t)$ is a geophone signal recorded at the sensor position.

7. The method of claim 1, wherein the step of calculating a down-going wavefield $w^s(t)_d$ at the sensor position comprises applying the equation:

$$w^s(t)_d = \frac{h^s(t) - g^s(t)}{2},$$

where $h^s(t)$ is a hydrophone signal recorded at the sensor position and $g^s(t)$ is a geophone signal recorded at the sensor position.

8. The method of claim 1, wherein the geophone signal $g^s(t)$ is obtained from a vertical geophone signal $g^{sv}(t)$ by applying the equation:

$$g^s(t) = \frac{g^{sv}(t)}{\cos(\theta)},$$

where $\theta$ is the angle of incidence between wave front and sensor.

* * * * *